July 2, 1946. J. H. GRAYSON 2,402,997
COOKING UTENSIL AND ITS HEATING MEANS
Filed June 8, 1942 2 Sheets-Sheet 1
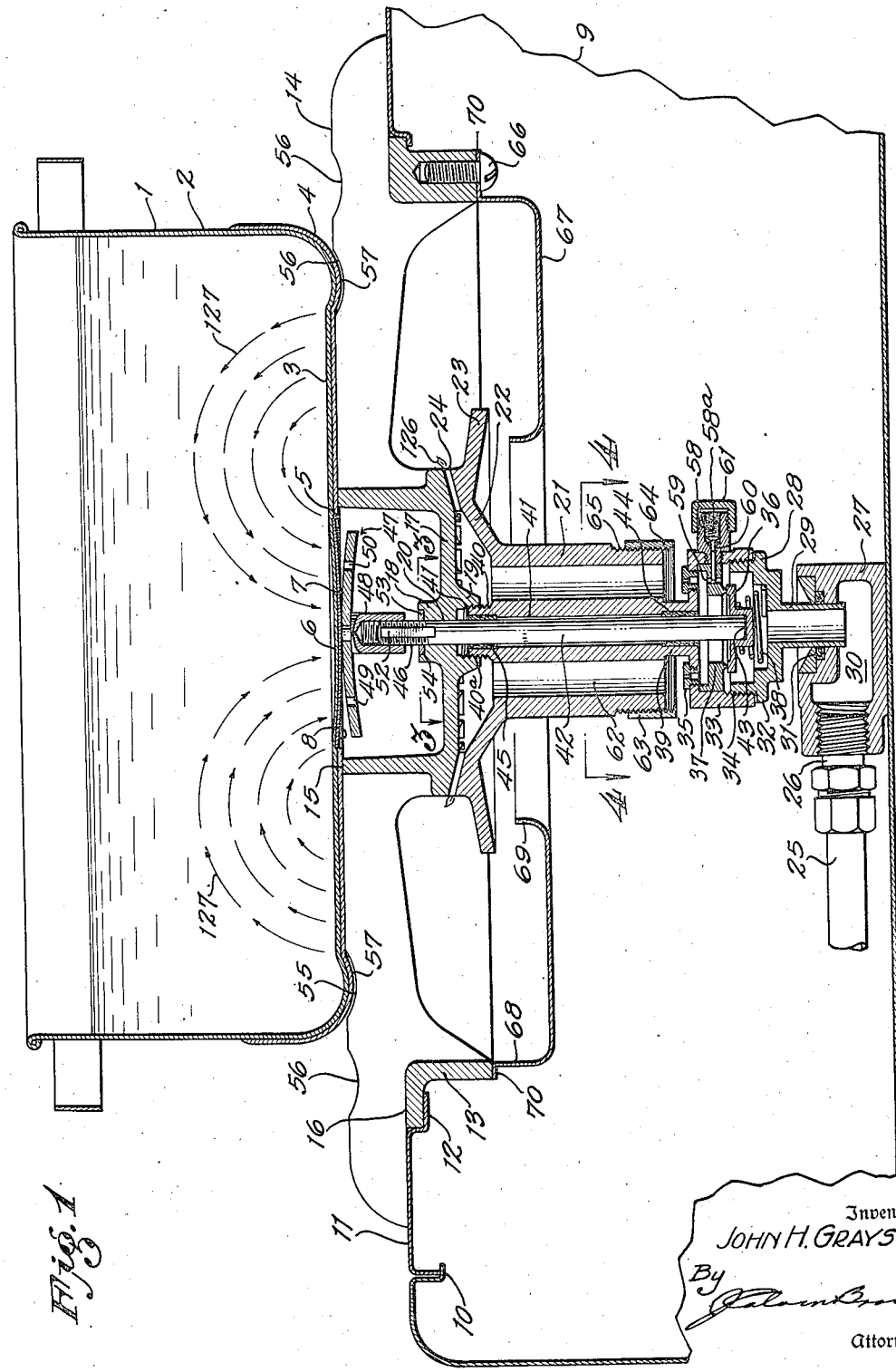
Inventor,
JOHN H. GRAYSON;
By
Attorney July 2, 1946.     J. H. GRAYSON     2,402,997
COOKING UTENSIL AND ITS HEATING MEANS
Filed June 8, 1942      2 Sheets-Sheet 2
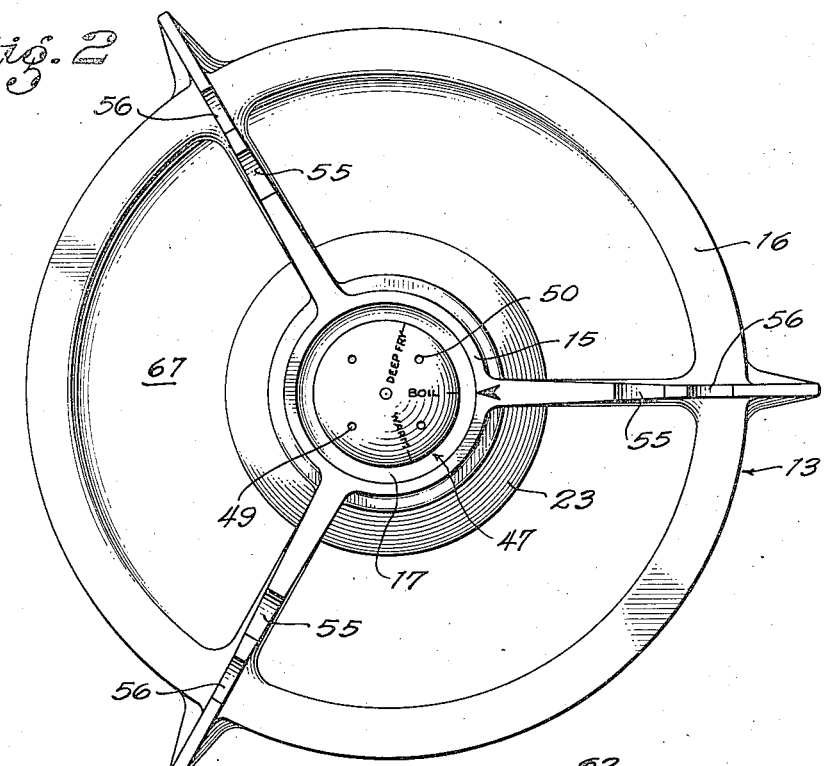
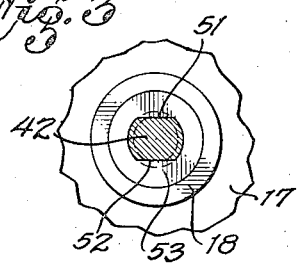
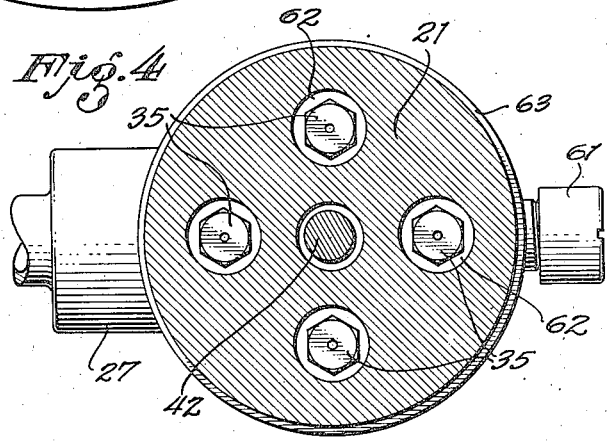
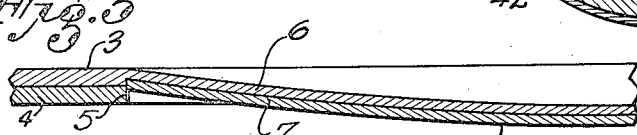
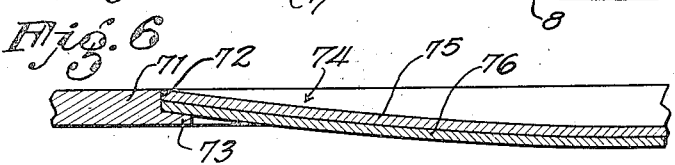
Inventor,
JOHN H. GRAYSON,
By
Attorney Patented July 2, 1946

2,402,997

UNITED STATES PATENT OFFICE 2,402,997

COOKING UTENSIL AND ITS HEATING MEANS

John H. Grayson, Monrovia, Calif., assignor Lowell & Grayson, Monrovia, Calif., a limited partnership Application June 8, 1942, Serial No. 446,203

22 Claims. (Cl. 236—33)

This invention relates to cooking utensils, and specifically to a type of cooking utensil so formed and constructed as to regulate to a predetermined degree a source of heat for said utensil.

At the present time, cooking utensils with their content, are ordinarily heated on a range of some form, either gas or electric. Often the content of said cooking utensil becomes too hot, boils over, or cooks away even in cases where the content is being watched. It also happens that certain foods should only be cooked to a determined temperature, which temperature is difficult to approximate by mere observation of the food.

An object of the present invention is the provision of means whereby any content within the utensil may be heated to a determined temperature, and as the said temperature is approximated, the heat source is controlled thermostatically so as to prevent a rise in the temperature to exceed that which has been determined.

In the carrying out of the object stated, I have provided a novel form of cooking utensil, say a pan, having a controlled heat responsive portion. I realize that most cooking utensils expand and contract in accordance with applied heat but, in the present instance, I so form the utensil that a given portion of the bottom wall thereof is controlled as to its movement. This given portion is adapted to cooperate with a valve or other heat regulating element to the end that movement of said portion actuates said valve or other heat regulating element. Actuation of the control member for any type of heater is contemplated by my invention, although only a gas burner with an automatically actuated control valve is shown herein. An electric heater of novel construction is disclosed and claimed in a divisional application, Serial No. 622,887, filed October 17, 1945, in which a switch for controlling the operation of the heater is similarly actuated.

An object of the invention is the provision of a cooking utensil so formed and constructed that when heat is applied thereto to heat any content within said utensil, a heat responsive portion on said utensil will have movement, the said movement being determined as to direction and amount by the temperature of the content in the utensil.

With reference to the aforesaid object, my invention is so arranged that when, for instance, food is placed in the utensil and heat applied to the utensil, a selected area of a wall of the utensil will be moved in response to change in the temperature of the food. If the temperature increases, there will be a corresponding movement of the heat responsive area.

Another object is the provision of a novel form of cooking utensil and controlled means for heating said utensil, wherein a change in the temperature of the content within said utensil causes regulation of the controlled means to diminish said heat or increase said heat to said content.

Other objects of the invention will readily suggest themselves to those who may use the invention, and particularly those skilled in the art to which the invention appertains.

With the above mentioned and other objects in view, the invention consists in the novel and useful provision, formation, construction, association, and relative arrangement of parts, members and features, all as shown in certain embodiments in the accompanying drawings, described generally, and more particularly pointed out in the claims.

In the drawings:

Figure 1 is a vertical sectional view of a gas burner and utensil combination made in accordance with my invention, Figure 2 is a plan view of the burner showing the grate or utensil support, Figure 3 is an enlarged sectional view on the line 3—3 of Figure 1, Figure 4 is a fragmentary enlarged sectional view on the line 4—4 of Figure 1, and Figures 5 and 6 are enlarged fragmentary sectional views of different forms of bimetallic heat responsive portions for the cooking utensil.

The same reference numerals are applied to corresponding parts throughout the views.

Referring now to the drawings, I have illustrated at 1 a cooking utensil, such as a pan, the same including a side wall 2 and bottom 3. This utensil, for convenience of description only, is assumed to have been constructed of stainless steel and provided with a copper clad bottom as indicated at 4. Stainless steel and copper have substantially the same temperature coefficient of expansion. I have removed an area of the copper clad portion substantially centrally of the bottom of the pan, as indicated at 5, and I have reduced the thickness of the relatively highly expansive stainless steel of the pan bottom 3 at this portion, as shown in Fig. 5, to provide a movable or distortable heat responsive portion 6. To the heat responsive portion 6, I have bonded, in any approved manner, a relatively lowly expansive disc 7, this disc having a negligible co-efficient of expansion as compared to the relatively high coefficient of expansion of the portion 6. For instance, the disc 7 is preferably made of 36% nickel steel, although that particular percentage may be varied or another metal suitable for the purpose may be used, but it is preferable for the temperature to which it is subject. The bonded metals 6—7 are concavo-convex in form and together form a bimetallic couple or thermostat 8 of the graduating type as part of the bottom of the pan or utensil 1. The convex surface of the thermostat is normally presented externally of the bottom of the utensil as shown in Figs. 1 and 5. It is evident that if heat is applied to the bottom of the utensil, there will be a difference in the rate of expansion between the portions 6 and 7 with the result that as the temperature of the utensil is raised, the thermostat 8 will tend to straighten or become coplanar with the bottom 3 of the utensil. This thermostat 8 is adapted to actuate means for controlling the operation of any type of heating means, as, for example, a valve for controlling the flow of gas to a burner while said burner is in operation under the utensil 1 on which the thermostat is provided. Specifically, 9 indicates the stove or range casing which is adapted to support a top grate and gas valve mechanism, as hereinafter detailed.

The stove casing is formed with a depressed flange 10 which carries a cooking top 11. This cooking top may assume any configuration, depending upon the stove construction. However, in the present instance, this cooking top is formed with a depressed flange 12, which supports a flanged ring 13. This ring 13 is ordinarily known as the top burner support and said ring carries a grate or utensil support 14. In the present form of the invention, I have provided a grate of the character shown in Figure 2, comprising three radial arms equidistantly spaced apart. These radial arms are interconnected by inner and outer rings 15 and 16. The ring 15 as will soon appear is cast integral with the burner top and also is integral with a horizontal wall 17 provided with upper and lower central bosses 18 and 19 and with a bore 20 extending centrally therethrough. The wall 17 forms a removable top for the burner body 21 which is provided at its upper end with an upwardly and outwardly flared or inclined wall 22, the outer marginal portion of which forms a downwardly inclined wall 23. Ports 24 are provided between walls 17 and 22. It is evident that while I have formed the grate 14 integral with the ring 15 and its associated parts that I may, nevertheless, form these parts separately.

25 is a pipe which communicates with a source of gas supply. This pipe, through a suitable connector 26, is threaded into a hollow fitting 27. 28 is a second hollow fitting which includes a tube 29 opening within the chamber 30 of the first fitting 27. A gas-tight seal is provided between the tube 29 and fitting 27, as indicated at 31. The fitting 28 is formed in two parts, namely, a hollow body 33 and cap 32, these parts being screw-threaded together, as indicated at 34. The hollow body part 33 is formed to carry gas jets or nozzles 35 (see Fig. 4). These jets in the present instance are four in number and equidistantly spaced apart. The fitting 28 accommodates a valve 36 and an annular valve seat 37. A spring 38 normally tends to close the valve. A reduced neck 39 connects the center of the top of the part 33 with the lower end of burner body 21 and is formed integral with these parts. The burner body is provided at 40 with an externally threaded nipple, and a longitudinal bore 41 is also provided in the burner body in coaxial alignment with bore 20 in the wall 17. The nipple 40 threads into the boss 19 as at 40a. A rod 42 extends through the bores 20 and 41, this rod being confined at its lower end within a central depressed portion 43 of the valve 36. Rod 42 is hereinafter termed the valve push rod, because movement of the rod 42 controls the opening and closing of the valve 36. Gas-tight seals are provided in the bore 41 to prevent leakage around the valve push rod 42 at 44 and 45. The valve push rod 42 is threaded at its upper end 46 for threaded engagement with the cap or disk 47. Disk 47 is termed the valve actuator, because it is adapted to engage the thermostat 8 on the bottom of the cooking utensil, and said valve actuator transmits movement to the push rod 42 and valve 36 in accordance with movement of the thermostat 8.

The valve actuator disc 47 is of convexo-concave form, the concave side being provided with an internally threaded central boss 48, which has threaded engagement with the end 46 of the valve push rod 42. The disc 47 is provided with openings, such as illustrated at 49 and 50, whereby a spanner wrench or equivalent means may be used to turn said disc to adjust (for purposes hereinafter detailed) the same endwise relative to the valve push rod 42. During any such adjustment, the valve push rod is held against turning by sliding engagement of a pair of parallel flattened surfaces 51 and 52 (see Figure 3), on the rod 42 at the point where it is passed through a correspondingly formed opening in a washer 53, which has pressed-fit engagement in a recess 54 in the top of the boss 18.

It is intended that the heat responsive means or thermostat 8 of the cooking utensil should be centered directly over the valve actuator 47 so that said heat responsive portion 8 lies within the confines of the ring 15 and is more or less shielded thereby from the direct heat of the flames of the burner. To accomplish this centering, any one of a number of means may be employed, one expedient being to provide the arms 14 of the grate with transverse concavities or depressions 55 and 56, to receive an annular bead portion 57 on the bottom of the cooking utensil. Thus, depending upon the diameter of the pan, the said annular bead 57 will be received in the concavities 55 or 56 of the grate. In this manner, the cooking utensil will have its heat responsive portion 8 centered over the valve actuator 47 and shielded within the ring 15.

At 58, I have shown a metering valve whereby a regulated amount of gas may flow through the jets 35, when the main valve 36 is closed. This valve 58 includes a small port or orifice 59, in the valve seat member 37 permitting communication between the jets 35 and the source of gas supply, and a metering pin 60, which may be adjusted in the orifice 59 by removing cap 61 and adjusting screw 58ᵃ. The metering valve 58 is usually adjusted to deliver just enough gas to keep the burner lighted and furnish only a minimum of heat, the adjustment being based on the smallest cooking utensil with a small amount of food therein so that this minimum quantity will not be overheated.

In the present embodiment of the invention, the burner body 21 has a mixer formed on the bottom thereof, the body being provided with four lengthwise and equi-distantly spaced bores 62 that function as mixer tubes. The jets 35 are positioned centrally with respect to and below the bores 62. To regulate the mixture of air and gas, I have provided an air valve 63 comprising an annular internally-threaded collar 64 adjustably mounted on the threaded lower end portion 65, of the burner body.

Secured to the flanged ring 13 in any appropriate manner, such as by the screws shown at 66, is a burner tray 67. This tray is annular in form and provided with outer and inner walls 68 and 69, the wall 68 being provided with an outwardly extending flange 70, which is secured to the flanged ring 13 by the screws 66. The wall 69 is of lesser height than wall 68, and is spaced from and under the baffle 23 for inlet of secondary air to the burner.

In passing, reference is had to Figure 6, wherein I have shown that the cooking utensil may be provided with a different kind of thermostat or heat responsive portion 74 of the character shown in this figure. In this construction the utensil bottom 71 is provided with a central flanged opening 72, and, within the opening, and bearing against the flange 73, is the thermostat or heat responsive member 74 composed of discs of two metals 75 and 76 of different thermal characteristics. As before, the heat responsive member is concavo-convex in form and tends to straighten or flatten as it becomes heated. Any convenient method may be utilized for securing the thermostat or heat responsive member 74 to the bottom 71, so as to form a fluid-tight seal.

The operation, uses and advantages of the invention are as follows:

To begin with, it is assumed that the utensil 1 contains some food product and that it is desired to heat this food to a boiling point. Accordingly, the actuator disc 47 is rotated prior to placing the utensil in position thereover so that the graduation (see Figure 2) indicating "boil" is opposite an arrow or index mark like that indicated on top of the ring 15 in Fig. 2. Other graduations may be provided on the actuator disc, such as "warm," "deep fry," etc., by means of which one may correctly adjust the actuator for proper operation by the thermostatic or heat responsive portion 8 of the cooking utensil.

In Figure 1, the valve 36 has closed against its seat so that the main gas supply to the burner is shut off, although the burner may be burning with a small flame as indicated at 126 due to the by-pass arrangement for the gas controlled by the metering valve 58. Normally, the convexity of the heat responsive portion of the cooking utensil 1 would be greater than that shown in Figure 1, and substantially that shown in Figures 5 and 6. If the food to be heated in the cooking utensil is cold, the convexo-concave heat responsive portion 8 of the utensil will contact the actuator 47 to depress the same, which will cause downward movement of the valve rod 42 and open valve 36, compressing spring 38. The gas is now "on" and gas discharged from the jets 35 mixes with air as it flows upwardly through the mixer 2, the combustible mixture thus formed being urned at the burner ports 24. Heat from the flame 126 will contact the base of the cooking utensil externally of the ring 15. The heat path is, therefore, through the food to the heat responsive portion 8 of the bottom of the utensil, the heat path being indicated by the curved arrows 127. As the heat responsive portion 8 of the utensil bottom is of bimetallic construction, the inner member of which has a high rate of expansion as compared to the outer one, the heat of the food will directly affect the heat responsive portion having the greatest thermal expansion, while that portion which has the least thermal expansion is shielded from the flames 126 by the ring 15. Thus, it will be seen that the temperature of the food directly affects and causes movement of the heat responsive portion of the utensil. When the food reaches the boiling point, the adjustment of the actuator disc 47 is such that it will follow movement of the heat responsive portion 8 of the utensil, which heat responsive portion tends to straighten, as illustrated in Figure 1. When there is sufficient movement of the actuator disc 47, the valve will be closed as the valve rod 42 and valve 36 move upwardly together under action of the spring 38. Thereafter the burner operates only with a small pilot flame controlled by the metering valve 58.

If the cooking utensil is not removed from the stove, it is evident that as the food cools, the heat responsive portion 8 of the utensil bottom gradually returns to its normal convexity and causes downward movement of the actuator 47. Slight movement of the actuator will open the valve 36 slightly and accordingly increase the size of the flame of the burner so as to apply more heat to the utensil.

When the cooking utensil is placed on the stove, it may be slid over the top of the grate until the annular bead portion 57 is received within the concavities 55 of the grate which centers the heat responsive portion 8 with respect to the actuator 47. The convexity of the actuator 47 facilitates sliding movement of the heat responsive portion 8 of the utensil, thereover.

Actual devices built in accordance with the invention described have been found to work satisfactorily in practice, and it is possible to prevent scorching or burning of food contained within a cooking utensil utilizing the invention described.

It is believed the foregoing description conveys a good understanding of the objects and advantages of my invention. The appended claims have been drawn to cover all legitimate modifications and adaptations.

I claim:

1. In combination, a heater adapted for heating a cooking utensil, said heater having a regulator element movable with respect thereto to regulate the operation of the heater, and a cooking utensil adapted to be supported removably on the heater having a thermostat forming a part of one wall thereof so that it is in intimate contact on the inner side thereof with the contents of said utensil and directly responsive to changes in temperature thereof, and is removable from the heater with the utensil and cleanable therewith, said thermostat being movable in response to temperature changes for direct operation of said regulator element when the utensil is supported on the heater for heating of its contents.

2. In combination, a burner and a utensil support thereabove, a regulating valve for said burner having a movable operating element extending therefrom to the utensil support for operation, and a cooking utensil adapted to be supported removably on the utensil support having a thermostat forming a part of one wall thereof so that it is in intimate contact on the inner side thereof with the contents of said utensil and directly responsive to changes in temperature thereof, and is removable from the utensil support with the utensil and cleanable therewith, said thermostat being movable in response to temperature changes for direct operation of the operating element of the regulating valve when the utensil rests on the utensil support for heating of its contents.

3. A structure as set forth in claim 1, wherein the thermostat comprises a bimetallic disc portion in a wall of the utensil, the central portion of which is adapted to move in the distortion of the thermostat when heated, the regulator element being movable by engagement with the central portion of said bimetallic thermostat.

4. A structure as set forth in claim 1, wherein the thermostat comprises a bimetallic disc portion in a wall of the utensil the central portion of which is adapted to move in the distortion of the thermostat when heated, the regulator element being movable by engagement with the central portion of said bimetallic thermostat, the structure further including an actuator threadedly adjustable on the end of the regulator element and rotatable for temperature adjustments relative to said regulator element.

5. A structure as set forth in claim 1, wherein the thermostat comprises a bimetallic disc portion in the bottom wall of the utensil the central portion of which is adapted to move in the distortion of the thermostat when heated, the regulator element being movable by engagement with the central portion of said bimetallic thermostat, the structure further including an enclosing ring on the top of the heater for surrounding the bimetallic thermostat to shield said thermostat from extraneous heat.

6. A structure as set forth in claim 2, wherein the thermostat comprises a bimetallic disk portion in a wall of the utensil the central portion of which is adapted to move in the distortion of the thermostat when heated, the operating element of the regulating valve being movable by engagement with the central portion of said bimetallic thermostat.

7. A structure as set forth in claim 2, wherein the thermostat comprises a bimetallic disk portion in a wall of the utensil the central portion of which is adapted to move in the distortion of the thermostat when heated, the operating element of the regulating valve being movable by engagement with the central portion of said bimetallic thermostat, the structure further including an actuator threadedly adjustable on the end of the operating element of the regulating valve and rotatable for temperature adjustments relative to said operating element.

8. A structure as set forth in claim 2, wherein the thermostat comprises a bimetallic disc portion in the bottom wall of the utensil the central portion of which is adapted to move in the distortion of the thermostat when heated, the operating element of the regulating valve being movable by engagement with the central portion of said bimetallic thermostat, the structure further including an enclosing ring above the burner for surrounding the bimetallic thermostat to shield said thermostat from extraneous heat.

9. As a new article of manufacture, a portable cooking utensil adapted to be placed removably on a heating device and having a thermostat forming a substantially flush and coplanar part of the botttom thereof arranged to be heated by the contents of the utensil to regulate by the consequent movement of said thermostat the operation of the heating devise, said thermostat being an integral part of the utensil removable with it from the heater device and adapted to be cleaned with it in the washing thereof.

10. As a new article of manufacture, a portable cooking utensil having a bottom wall for support thereof on a utensil support over a heater, the bottom wall having an opening in the approximate center thereof, and a bimetallic thermostat forming a closure for said opening and adapted to be heated by the contents of the utensil to regulate by consequent movement of the central portion of the thermostat the operation of the heater.

11. In combination, a heater adapted for heating a cooking utensil, said heater having a regulator element movable with respect thereto to regulate the operation of the heater, a cooking utensil adapted to be supported removably in operative relation to the heater, a thermostat forming a part of one wall of said cooking utensil arranged to be heated by the contents of the utensil and removable from the heater with the utensil, said thermostat being movable in response to temperature change of the contents of said utensil, and means operable by said thermostat when the utensil is in operative relation to the heater for heating of its contents to transmit movement from said thermostat to said regulator element, said means being adjustable relative to said regulator element in the direction of movement of said thermostat.

12. In combination, an automatic gas burner, comprising a burner body having flame ports, a cooking utensil adapted to be supported removably over said burner and having a thermostat forming a part of the bottom wall thereof so that it is in intimate contact on the upper side thereof with the contents of said utensil and directly responsive to changes in temperature thereof and is removable from the burner with the utensil, said thermostat having movement of its central portion in response to temperature change of the contents of said utensil, a gas valve body rigid with the burner body and arranged to deliver gas to the flame ports, a valve element movable relative to a valve seat in said valve body, spring means normally tending to close the valve element, and a push rod extending upwardly through the burner body from the valve element and arranged to be operated by the thermostat to open the valve against action of the aforesaid spring means, whereby said valve element is arranged to be moved in response to changes in temperature of the thermostat.

13. In combination, an automatic gas burner, comprising a burner body having flame ports, a ring enclosure extending upwardly from the burner body inside the heat zone of the flame ports and having the top thereof arranged to be brought in close proximity with the bottom of a cooking utensil to be heated by the burner, a cooking utensil adapted to be supported removably over said burner and having a thermostat forming a part of the bottom wall thereof and located so as to lie within the ring enclosure when the utensil is placed in operative relation to the burner, said thermostat being in intimate contact on the upper side thereof with the contents of said utensil and directly responsive to changes in temperature thereof and being removable from the burner with the utensil, said thermostat having movement of its central portion in response to temperature change of the contents of said utensil, a gas valve body rigid with the burner body and arranged to deliver gas to the flame ports, a valve element movable relative to a valve seat in said valve body, spring means normally tending to close the valve element, and a push rod extending upwardly through the burner body from the valve element and arranged to be operated by the thermostat to open the valve against the action of the aforesaid spring means, whereby said valve element is arranged to be moved in response to changes in temperature of the thermostat.

14. The combination as set forth in claim 13, including an actuator adjustably threaded on the upper end of the push rod within the ring enclosure and having engagement with the central portion of the thermostat, said actuator being rotatably adjustable relative to an index mark on the burner to permit heating the contents of the utensil to a higher or lower temperature as desired.

15. An automatic gas burner, comprising a burner body having flame ports, a utensil support over the burner body for support of a utensil in a fixed spaced relation vertically above the flame ports, a gas valve body rigid with the burner body spaced below the flame ports and having gas discharge jets on the top thereof, the burner body having gas conducting passages extending upwardly therein toward and communicating with the flame ports, the lower ends of the passages being in spaced relation to the aforesaid jets whereby to entrain air with the gas discharged into said passages from said jets, a valve element movable relative to a valve seat in said valve body, spring means normally tending to close the valve element, and a push rod extending upwardly through the burner body from the valve element and arranged to be operated to open the valve against the action of the aforesaid spring means by a cooking utensil placed on the utensil support, said valve body having a by-pass passage therein for by-passing enough gas to the jets to maintain a pilot flame on the burner when the valve element is closed.

16. In a heat-controlled cooking pan, the combination of a pan having a thermostatic means in the bottom thereof as an integral part of said bottom that is removable with the pan from a heating member and adapted to be cleaned with it, and a heating member having an actuator operable in unison with the said thermostatic means in the movement thereof relative to the pan when the pan is disposed in heating proximity to the heating member for controlling a predetermined temperature.

17. In combination, a cooking utensil having a bimetallic thermostatic means substantially coaxial with and forming a substantially flush portion of the bottom of the utensil, and a heating means having an actuator operable by the thermostatic means for automatic regulation of a predetermined temperature of food in said utensil.

18. In combination, a utensil having a bimetallic thermostatic means substantially coaxial with and forming a substantially flush portion of the utensil, and a heating means having an actuator operable by the thermostatic means for automatic regulation of a predetermined temperature of contents in said utensil.

19. A stainless steel cooking utensil having a relatively high coefficient of expansion, a copper-clad bottom having a circular opening extending partially through the stainless steel in the bottom thereof, a thin disk of metal having a low coefficient of expansion inserted in the said opening and bonded to the stainless steel forming a bimetal thermostatic means for actuating a heater regulator element for control of a utensil heating means according to temperature changes.

20. A cooking utensil of the character described having a bottom adapted to rest on a utensil support over a gas burner or the like, the central portion of said bottom being recessed and forming one element of a bimetallic thermostat, there being another element for said thermostat having a different coefficient of expansion inserted in the recess in said bottom and bonded to the bottom wall to complete a bimetallic thermostat adapted for actuating a heater regulator element in response to temperature changes of the contents of the utensil.

21. In combination, a utensil having a thermostatic means forming an integral part of a wall thereof in direct contact on the inner side with the contents of said utensil, whose temperature change is adapted to cause a movement thereof, and adapted to have direct contact on its outer side with an actuator of a heating member, and a heating member having an actuator operable by said thermostatic means.

22. In combination, a heating member having a regulator element tending normally to move in one direction to a shut-off position, and a container adapted to be supported removably on said heating member having a thermostat forming a part of a wall thereof and movable in response to temperature change of the contents of said container, said thermostat being arranged to move the regulator element from shut-off position when the container is placed on the heating member, and being further arranged to permit return of said regulator element toward shut-off position in proportion to temperature rise of the contents of said container.

JOHN H. GRAYSON.

Certificate of Correction

Patent No. 2,402,997.

July 2, 1946.

JOHN H. GRAYSON

It is hereby certified that errors appear in the printed specification of the above numbered patent requiring correction as follows: Column 7, line 4, claim 3, for "se" read *set*; line 68, claim 9, for "botttom" read *bottom*; column 10, line 5, claim 18, after "portion" insert *of the bottom*; and that the said Letters Patent should be read with these corrections therein that the same may conform to the record of the case in the Patent Office.

Signed and sealed this 17th day of September, A. D. 1946.

[SEAL]

LESLIE FRAZER,
*First Assistant Commissioner of Patents.*